Nov. 29, 1966　　E. T. GETZ ETAL　　3,287,987
PULLEY APPARATUS
Filed April 28, 1964　　2 Sheets-Sheet 1

INVENTORS
EDWARD T. GETZ
MATTHEW PACAK
JOSEPH E. UDVARDI

BY
Teague, Stout & Sadler
ATTORNEYS

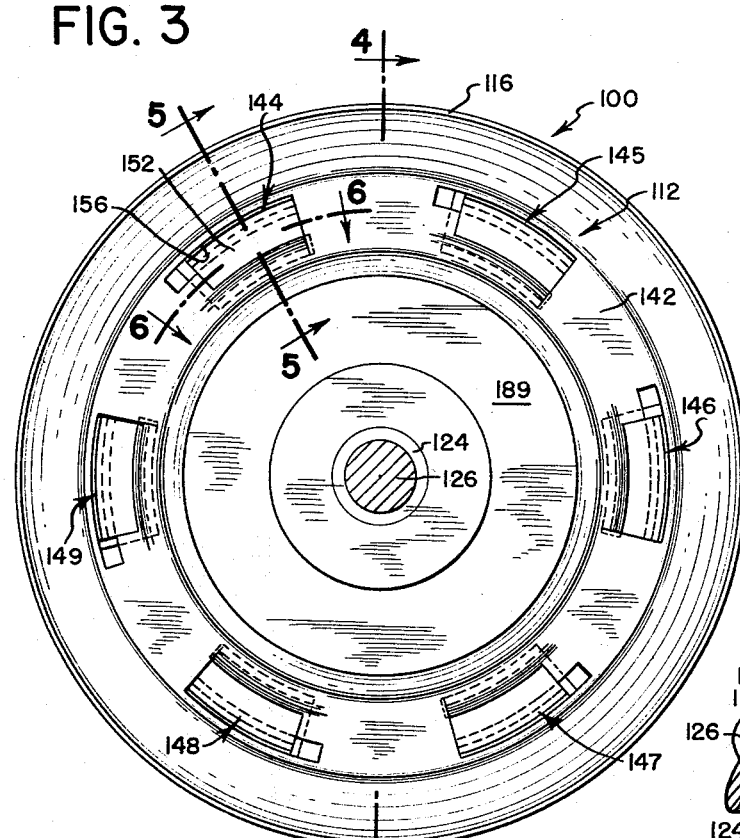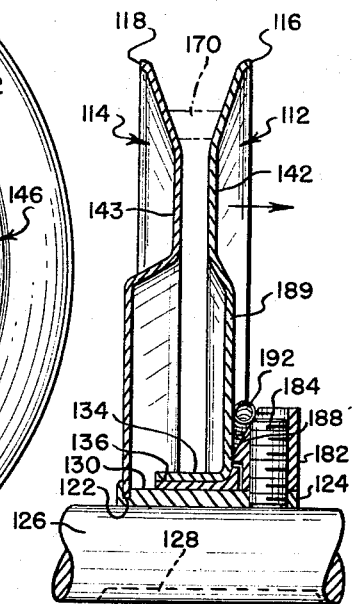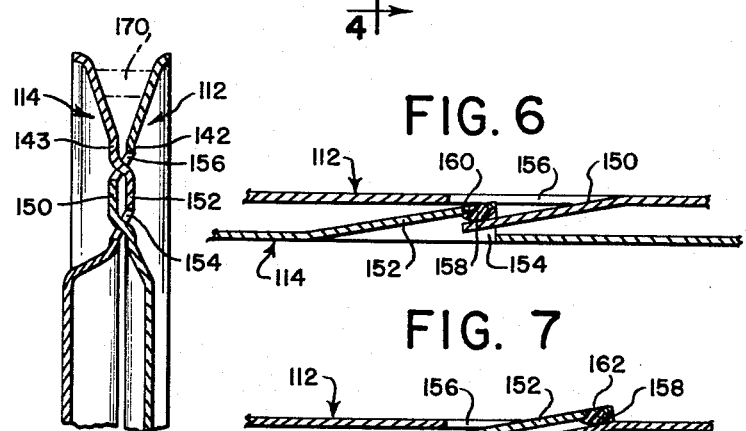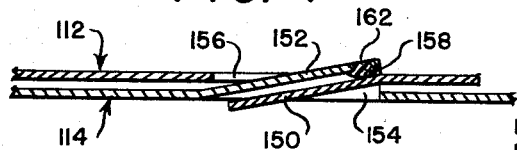
INVENTORS
EDWARD T. GETZ
MATTHEW PACAK
JOSEPH E. UDVARDI
ATTORNEYS United States Patent Office 3,287,987
Patented Nov. 29, 1966

3,287,987
PULLEY APPARATUS
Edward T. Getz, Cleveland Heights, Matthew Pacak, Solon, and Joseph E. Udvardi, Cleveland, Ohio, assignors to Eaton Yale & Towne Inc., a corporation of Ohio
Filed Apr. 28, 1964, Ser. No. 363,183
10 Claims. (Cl. 74—230.17)

The present invention relates, generally, to torque transmitting devices of the pulley type.

More specifically, this invention relates to self-compensating torque transmitting pulley apparatus that is so constituted and arranged as to releasably, substantially permanently automatically adjust for slippage occurring between the sheave halves thereof and the driving means engageable therewith, such slippage being due to increased loads imposed upon the said apparatus during its operation.

Heretofore, numerous types of self-compensating pulley apparatus have been suggested which utilize the basic principle of providing control means cooperable with the pulley. The control means, upon response to slippage or drag occurring at increased loads on the pulley, is utilized to reduce the distance between the sheave halves in an effort to increase the working or effective pitch diameter of the pulley. Accordingly, the function of the control means is to relieve the slack in the belt or similar driving means passing between the sheave halves. This application of a self-compensating pulley is particularly desirable in situations where it is necessary to take up slack or slippage in belt-type driving means extending between the sheave halves.

However, such types of self-compensating pulley apparatus as have heretofore been suggested are so constituted and arranged as to be particularly inefficient in performing the function of automatically compensating for the slack or slippage in belt-type driving means. This is particularly true when the use of a flexible belt as a driving means is extensive, since variations in the loading applied thereto are continuous, and there occurs stretching or similar permanent deformation of the belt. Due to the inefficiency of such self-compensating pulley apparatus, the overall length of the belt is increased to reduce tension therein and, accordingly, slippage between the sheave halves is suffered, thereby reducing the load-carrying capabilities of the pulley.

Moreover, little, if any, provision is made for maintaining the sheave halves of the pulley apparatus in the compensated position, even should there be found some semblance of efficiency in the performance of the function of such types of self-compensating apparatus.

In situations wherein such a load responsive automatically compensating pulley apparatus is used in a pulley system as either a drive or driven pulley in one sequence of operation and an idler pulley in another sequence of operation such provision must be made to retain the sheave halves of the pulley apparatus in compensated position during the idler sequence.

Thus, such inefficiency is compounded in that heretofore suggested types of self-compensating pulley apparatus are substantially, if not completely, incapable of maintaining proper tension in the driving means, especially during each and every one of the sequences of operation of a device with which the pulley apparatus is structurally operatively associated.

Accordingly, having in mind each and every one of the above disadvantages, and others that will be readily apparent to those skilled in the art, it is a primary object of the present invention to provide self-compensating torque transmitting apparatus that is so constituted and arranged as to releasably, substantially permanently, automatically adjust for slippage occurring between the sheave halves thereof and the driving means engageable therewith, such slippage being due to increased loads imposed upon the said apparatus during its operation.

A further primary object of this invention is to provide self-compensating torque transmitting pulley apparatus comprising compensating means that is so constituted and arranged as to unusually efficiently, automatically compensate for lengthening of belt-type driving means, said compensating means being further so constituted and arranged as to be releasably, substantially permanently maintained in any one of a substantially infinite plurality of compensated positions.

Another primary object of the present invention is to provide self-compensating torque transmitting pulley apparatus comprising compensating means for unusually efficiently, automatically compensating for lengthening of belt-type driving means, said compensating means comprising a plurality of inserts so constituted and arranged as to be threadably rotatably mutually cooperatively engageable with one another, in combination with maintaining means for releaseably, substantially permanently maintaining said compensating means in any one of a substantially infinite plurality of compensated positions.

Yet another primary object of this invention is to provide self-compensating torque transmitting pulley apparatus comprising compensating means for unusually efficiently automatically compensating for lengthening of belt-type driving means, said compensating means comprising a plurality of molded inserts so constituted and arranged as to be threadably rotatably mutually cooperatively engageable with one another, in combination with maintaining means for releaseably substantially permanently maintaining said compensating means in any one of a substantially infinite plurality of compensated positions, said maintaining means being so constituted and arranged as to be continuously mutually cooperatively engageable with the periphery of one only of said plurality of inserts, enabling said one insert to be rotatably moveable relative to another of said plurality of inserts in one of a plurality of directions only, and to be precluded from rotational movement in another of said plurality of directions.

Further, it is a primary object of the present invention to provide self-compensating torque transmitting pulley apparatus comprising compensating means for unusually efficiently, automatically compensating for lengthening of belt-type driving means, said compensating means comprising a plurality of inserts, each one of which is moldingly structurally operatively associated with a corresponding one of a plurality of sheave halves, said inserts being so constituted and arranged as to be threadably rotatably mutually cooperatively engageable with one another, in combination with maintaining means for releasably substantially permanently maintaining said compensating means in any one of a substantially infinite plurality of compensated positions, said maintaining means being axially disposed medially of said sheave halves, and being so constituted and arranged as to be releaseably mutually cooperatively engageable with the periphery of one only of said plurality of inserts, enabling said one insert to be rotatably moveable relative to another of said plurality of inserts in one of a plurality of directions only, and to be precluded from rotational movement in another of said plurality of directions.

Still further, it is a primary object of this invention to provide self-compensating torque transmitting pulley apparatus comprising compensating means for unusually efficiently automatically compensating for lengthening of belt-type driving means, said compensating means comprising a plurality of molded inserts so constituted and arranged as to be threadably, rotatably mutually cooperatively engageable with one another, the improvement comprising maintaining means for releasably, substantially permanently maintaining said compensating means in any one of a substantially infinite plurality of compensated positions, said maintaining means being so constituted and arranged as to be mutually cooperatively engageable with the periphery of one only of said plurality of inserts, enabling said one insert to be rotatably moveable relative to another of said plurality of inserts in one of plurality of directions only, and to be precluded from rotational movement in another of said plurality of directions.

Another primary object of the present invention is to provide a self-compensating, torque transmitting pulley apparatus wherein the compensating means comprises interengageable structure formed integral with the sheave halves radially outwardly disposed from the hub portion of the pulley, the improvement comprising maintaining means for releasably, substantially permanently maintaining said compensating means in any one of a substantially infinite plurality of compensated positions, said maintaining means being so constituted and arranged as to be mutually cooperatively engageable with the periphery of one of said sheave halves, enabling said one sheave half to be rotatably movable relative to the other of said sheave halves in one of a plurality of directions only, and to be precluded from rotational movement in another of said plurality of directions.

Still another primary object of the present invention is to provide self-compensating torque transmitting pulley apparatus comprising compensating means for unusually efficiently automatically compensating for lengthening of belt-type driving means, the improvement comprising maintaining means for releaseably substantially permanently maintaining said compensating means in any one of a substantially infinite plurality of compensated positions.

Other objects and important features of the invention will be apparent from a study of the specification following taken with their drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIGURE 3 is a plan view of a modified form of self-compensating, torque transmitting pulley apparatus constructed in accordance with the principles of the present invention;

FIGURE 4 is an enlarged sectional view taken substantially along line 4—4 of FIGURE 3, showing the sheave halves in one of a substantially infinite plurality of positions;

FIGURE 5 is an enlarged partial sectional view taken substantially along line 5—5 of FIGURE 3, showing the sheave halves in another of said plurality of positions;

FIGURE 6 is an enlarged partial sectional view taken substantially along line 6—6 in FIGURE 3, showing the relationship of the compensating means to the sheave halves when they are in said one position; and FIGURE 7 is a view similar to FIGURE 6, showing the compensating means and sheave halves in said other position.

This application discloses pulley apparatus that is an improvement of the pulley apparatus disclosed in co-pending application Serial No. 307,983, filed September 10, 1963, now Patent No. 3,196,702 and entitled "Pulley Apparatus," and co-pending application Serial No. 250,672, filed January 10, 1963, now Patent No. 3,161,071, and entitled "Torque Transmitting Device."

Figure 1:
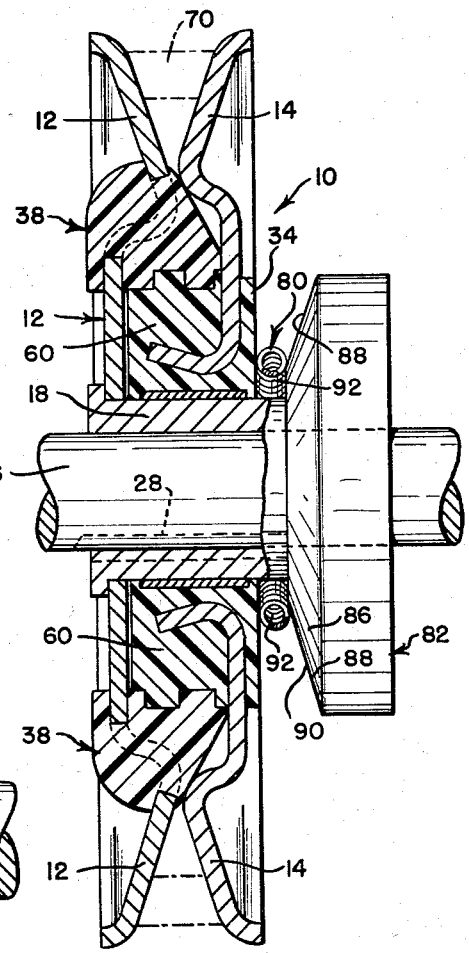
FIGURE 1 is a sectional view of self-compensating torque transmitting pulley apparatus, constructed in accordance with the principles of the present invention, and illustrating certain component parts in one of a substantially infinite plurality of positions.
Figure 2:
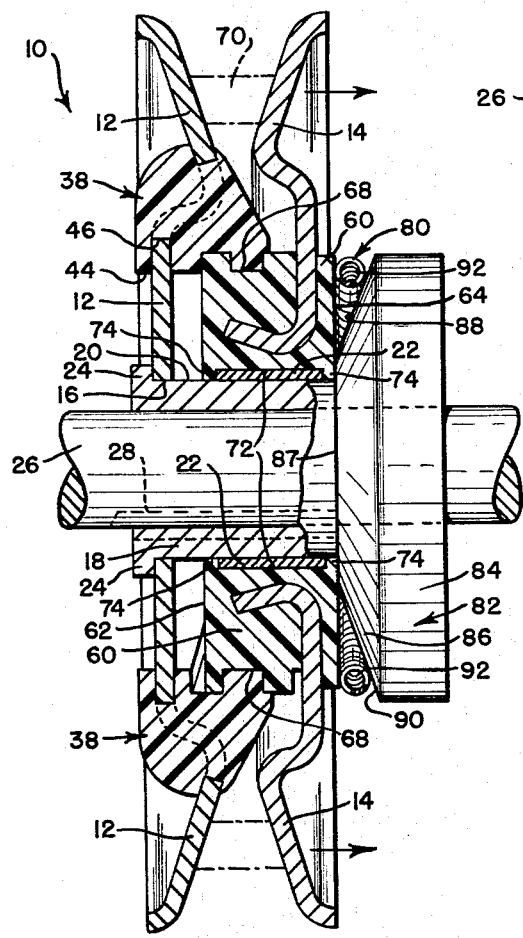
FIGURE 2 is a view similar to FIGURE 1, but illustrating said component parts in another of said plurality of positions.

Referring now to the drawing, there is illustrated in FIGURES 1 and 2 a self-compensating or automatically compensating torque transmitting pulley apparatus 10, constructed in accordance with the principles of the present invention, and comprising a plurality of sheave halves 12 and 14.

The sheave half 12 is provided with a generally centrally disposed annular or circular opening or aperture 16. An axially extending annular or generally cylindrical hub portion 18 is disposed within the opening 16 and non-rotatably secured therewithin with respect to the sheave half 12, in any suitable manner, as by press-fitting, staking, or any other suitable operation. The hub portion 18 has a bearing surface 20 extending completely annularly about the external or exterior periphery thereof with the bearing surface 20 being rotatably mutually cooperatively engageable with an annular or generally cylindrical bushing 22. The bushing 22 completely annularly encompasses the hub portion 18 substantially throughout the longitudinal dimensional extent thereof in order to define a substantial bearing surface therebetween.

The hub portion 18 comprises at one end thereof a radially outwardly extending generally annularly configured flange portion 24 at one end thereof that is mutually cooperatively engageable with one end of the sheave half 12 in order to predetermine the position of the sheave half 12 with respect to the hub portion 18. In addition to being generally cylindrical, the hub portion 18 is of tubular configuration and non-rotatably structurally operatively associated with a shaft 26. To this end, the hub portion 18 and the shaft 26 are each provided with splines 28. Of course, any other means for non-rotatably connecting the hub portion 18 to the shaft 26 may be used, such as a key arrangement, press-fit, or the like. The shaft 26 provides a power input for the apparatus 10, as by means of a suitable motor of conventional construction (not shown), or may provide a power output from the apparatus 10 to any desired location of use (also not shown).

An insert 38 is non-rotatably mutually cooperatively engageable and structurally operatively associated with the sheave half 12. The insert 38 may be fabricated of any suitable material, such as a plastic, and preferably is fabricted of nylon. In this manner, the insert 38 can be subjected to a suitable molding process so that the portions of the plasticized or synthetic material of the insert flows through slots (not shown) of the sheave half 12. Thus, the insert 38 is formed on both sides of the sheave half 12. Stated in other words, the insert 38 completely encompasses a substantial portion of the sheave half 12 axially thereof, that is, in a direction axially of the sheave half or along the longitudinal axis of the hub portion 18, and radially thereof, that is, in a direction generally perpendicularly disposed with respect to the aforementioned axis, and completely annularly thereabout. In accordance with this construction, the insert 38 is rigidly keyed, that is, mutually cooperatively engageable and structurally operatively associated, to the sheave half 12 for conjoint rotation therewith.

The insert 38 is further provided with a generally centrally disposed bore 44 which extends completely therethrough and the bore 44 may have an interiorly threaded portion 68 for a purpose to be described hereinafter.

An insert 60 is provided which is non-rotatably mutually cooperatively engageable and structurally operatively associated with the sheave half 14. The insert 60 may be fabricated of any suitable material, such as a plastic, and preferably is fabricated of nylon, as is the insert 38. In this manner, the insert 60 may be subjected to a suitable molding process to enable portions of the plasticized or synthetic material from which the insert 60 is fabricated to flow through slots (not shown), extending through the sheave half 14, and an opening (not shown) disposed centrally of the sheave half.

It will be understood that the insert 60, therefore, comprises a front face 62 and a rear face 64 disposed in generally parallel relationship with respect to the front 62, so that the insert 60 is formed on both sides of the sheave half 14. Stated in other words, the insert 60 completely encompasses a substantial portion of the sheave half 14 axially thereof, that is, in a direction axially of the sheave half 14 or along the longitudinal axis of the hub portion 18, and radially thereof, that is, in a direction generally perpendicularly disposed with respect to the aforementioned axis, and completely annularly thereabout. In accordance with this construction, the insert 60 is rigidly keyed that is, mutually cooperatively engageable and structurally operatively associated, to the sheave half 14 for conjoint rotation therewith. Relative movement between the insert 60 and the sheave half 14 is precluded since cooling the material from which the insert 60 is formed subsequent to forming the insert 60 upon the sheave half tends to shrink the same, resulting in a good snug fit.

The insert 60 may further be provided with an exteriorly threaded portion 68 that extends completely annularly about the periphery thereof. The threaded portion 68 is mutually cooperatively engageable with the threaded portion 46 of the insert 38, as will be more fully described and disclosed hereinafter.

As pointed out above, the bushing 22 completely annularly encompasses the hub portion 18. More specifically, the bushing 22 is rotatably mutually cooperatively engageable with the hub portion 18 and, to this end, the bushing 22 is non-rotatably secured to the insert 60, as by means of a press-fit within a bore 72, disposed generally centrally of the insert 60 and extending therethrough. Further, the bushing 22 is retained with respect to the insert 60 against axial movement by lip portions 74 on the insert overlapping the ends of the bushing. It should also be noted that bushing 22 could be rotatably secured within the bore 72 by providing a plurality of circumferentially spaced, axially extending grooves or recesses (not shown) in the outer periphery thereof. Thus, the sheave half 12, in view of the non-rotatable engagement with the hub portion 18, is rotatable with respect to the sheave half 14, in view of the latter's non-rotatable engagement with the bushing 22 and the rotatable relationship between the bushing 22 and the hub portion 18. And, in addition to the rotatable relationship between the sheave halves 12 and 14, the same are axially movable with respect to one another, in view of the mutual cooperative engagement between the threaded portions 46 and 68, respectively.

It is believed that the pulley apparatus 10 has been described thus far in such a manner as to present a clear understanding to those skilled in the art. Accordingly, further description thereof is not deemed necessary, especially since the said apparatus, as described thus far, is disclosed in detail in the aforementioned application Serial No. 307,983, filed September 10, 1963, now Patent No. 3,196,702. Therefore, should an even clearer and more detailed understanding of the apparatus 10 be desired, to the extent described above, reference can be had thereto.

In the operation of the apparatus 10, as will be more fully described hereinafter, the inserts 38 and 60 together comprise compensating means for unusually efficiently automatically compensating for lengthening of the belt-type driving means 70, said compensating means comprising a plurality of molded inserts that are so constituted and arranged as to be threadably rotatably mutually cooperatively engageable with one another. In certain applications of the apparatus 10, it may well be desirable to releasably substantially permanently maintain or retain the same in its compensated position. To this end, there is provided maintaining means 80 for releasably substantially permanently maintaining said compensating means in any one of a substantially infinite plurality of compensating positions.

The maintaining means 80 preferably comprises a stop member 82 having a generally cylindrical portion 84 and a tapered portion 86 extending downwardly towards the insert 60. The tapered portion 86 at its inner or smaller end 87 is rigidly secured to or formed integral with the hub member 18 and thus the stop member 82 is adapted for rotation with the hub member 18 and the shaft 26. The inner end 87 of the stop member 82 extends radially beyond the hub member 18 and thus is adapted to engage the rear face 64 of the insert 60 to provide a stop for the axial movement of the insert 60 to the right as seen in FIGURES 1 and 2. In addition, the shaft 26 may be fixed to the stop member 82, in any suitable manner, to preclude relative axial movements therebetween.

The tapered face 88 of the portion 86 extends from the inner end 87 to the generally cylindrical portion 84 and defines a generally V-shaped cam groove 90 with the rear insert face 64. Slidably disposed for contraction in the cam groove 90 is a garter spring 92 of any suitable or conventional type which is in contact with the tapered face 88 and the rear face 64 of the insert 60. The rate, weight, length, etc., of the garter spring 92 and the length and angle of inclination of the tapered face 88 may vary considerably, the only requirement being that the force supplied by the garter spring be sufficient to maintain the inserts 38 and 60 and thus the sheave halves 12 and 14, respectively, in any one of their substantially infinite plurality of compensated positions against the force exerted by the pulley drive belt 70, as will be more fully described hereinafter.

In the operation thereof, loss or lack of tension in the drive means or belt 70 is induced due to the lengthening thereof during periods of extended usage. This loss of tension produces slack in the said drive means which, in turn, results in slippage of the drive means across the surface of the sheave half 12. Slippage between the drive means 70 and the sheave half 12 occurs since the frictional force therebetween is overcome by the non-rotatable relationship between the sheave half 12 and the shaft 26 by means of the hub portion 18. However, the sheave half 14 is rotatable with respect to the shaft 26, by means of the bushing 22, and the frictional force between the drive means 70 and the sheave half 14 precludes slippage therebetween. Movement of the sheave half 14 with the drive means 70, and the mutual cooperative engagement of the threaded portions 46 and 68 causes relative rotation between the sheave halves 12 and 14, and axial compensating movement thereof in a direction towards one another, as shown in FIGURE 1. The effective diameter of the apparatus 10 is thus increased to maintain proper tension in the drive means 70 by unusually efficiently eliminating any slack therein.

Once the sheave halves 12 and 14 have axially moved to a compensated position, e.g., from the position shown in FIGURE 2 to that shown in FIGURE 1 to compensate for the increased length of the drive means or belt 70, they are precluded from moving to another position by the garter spring maintaining means 80 unless there is another variation in the length or tension of the drive means or belt 70. The garter spring 82 is wedged into the cam groove 90 and thus into frictional engagement with the rear face 34 of the insert 60 to prevent axial movement thereof when the belt 70 is at the proper, predetermined tension. When the tension of the belt 70 deviates from the desired or predetermined amount, the garter spring 92 will be slidably moved radially in the cam groove 90 until the inserts 38 and 60 are in a proper compensating position. The force of the garter spring 92 is then sufficient to resist further radial movement thereof and to thus maintain the inserts 38 and 60 in the compensated position.

Still further, while the maintaining means 80 has been disclosed as structurally coacting with a particular pulley apparatus 10, it will be understood that said maintaining means can be disposed to structurally coact with any suitable pulley apparatus, for example, the modified form of pulley apparatus illustrated in FIGURES 3 through 7.

The modified pulley apparatus 100 comprises a pair of sheave halves 112 and 114 axially disposed with respect to one another. The sheave halves 112 and 114 respectively, are formed so that upon assembly their outer peripheral portions 116 and 118 define a V-shaped groove for receipt of a driving means such as a belt 170 shown in dotted lines. The particular configuration of the V-shaped groove, as shown in FIGURE 4, can be made by either casting or preferably stamping the pulley material into the particular shape desired for use with a driving or driven belt means.

At the radially innermost central portion of sheave half 114 is a substantially cylindrical opening 122 adapted to receive a pulley hub member 124 therein. Member 124 preferably is permanently secured to sheave half 114 by press-fitting, staking, keying or like securing operation. The hub member 124 is adapted to be secured in driving relation to a shaft 126 by press-fitting, keying, or by means of splines 128. The hub member 124 has a smooth outer bearing surface 130 upon which a bushing 132 is rotatably journaled. The sheave half 112 is formed with an inner peripheral axially extending portion 134, concentric to the axis of rotation of the pulley 100. The surface 136 of the portion 134 forms an opening in sheave half 112 which circumscribes the outer periphery 138 of bushing 132 and is rigidly secured thereto by press-fitting, staking or like securing operation. An annular lip portion 140 on bushing 32 cooperates with portion 134 (see FIGURE 4) to aid in retaining sheave half 112 on the bushing 132 against any force of the belt 170 tending to axially move the sheave half 112 relative to the bushing 132. It thus becomes readily apparent, that the relationship of bushing 132 and hub member 124 axially locates the sheave halves 112 and 114 with respect to each other and allows relative rotation of the sheave halves with respect to one another.

Attention is now directed to FIGURES 3, 5, 6 and 7 wherein the modified compensating means is disclosed that functions to maintain proper belt tension. The compensating means takes the form of a plurality of interrelated tab and slot means shown at 144, 145, 146, 147, 148 and 149. Since these interrelated tab and slot means are of substantially the same configuration, only the tab and slot arrangement shown at 144 will be described in detail. As shown in FIGURES 5, 6 and 7, the sheave halves 112 and 114, respectively, contain tab elements 150 and 152 angularly disposed out of the plane of the face portions 142 and 143, respectively, of sheave halves 112 and 114. Tab elements 150 and 152 are integral with the respective sheave halves and are substantially L-shaped. In the formation of these tab elements 150 and 152, the tabs are stamped out of the faces 142 and 143 of the respective sheave halves 112 and 114 to expose an L-shaped opening in each sheave half which is of substantially the same shape, length and width as the tab elements. The tab element 150 on sheave half 112 is adapted to be received in the opening 154 in sheave half 114 and, in like manner, the tab element 152 on sheave half 114 is adapted to be disposed in the opening 156 in sheave half 112. Adjacent the end portion of a tab element 152 is a button 158 engageable with tab element 150 to function as a bearing member between the tab elements 150 and 152. This button to tab element contact eliminates the necessity of the two mating tabs of the sheave halves to be coincident or stamped to the same arcuate form. The button 158 is formed of a low coefficient of friction resilient material such as a plastic, and is secured to tab element 152 by any suitable means such as press-fitting a shank portion 162 thereof into opening 160 in the tab element. This type of button material performs a sound damping function between the mating tab elements of the sheave halves. It is also apparent that the button 158 could be secured to tab element 152 by any other suitable means such as by an adhesive or permanent moulding.

In the embodiment disclosed in FIGURE 3, six tab and slot compensating means 144–149 are shown; however, any number of such compensating means could be utilized, depending upon the size of the pulley that is to be used to perform the self-compensating function.

In operation of this modified pulley apparatus 100, slippage of belt 170 across the surface of the V-shaped groove formed by the sheave halves 112, 114 resulting from either belt wear or increased loads thereon, will tend to rotate the sheave half 112 with respect to the sheave half 114. Since sheave half 114 is journaled to shaft 126 constituting the output element of the pulley adapted to have a load thereon, slippage of the belt 170 in the V-shaped groove when driving the pulley, will result in slippage between sheave half 114 and belt 170. Since sheave half 112 is rotatably journaled on shaft 126 through bushing 132, sheave half 112 carries no load thereon. Therefore, as belt 170 slips on sheave half 114, sheave half 112 will continue to be driven resulting in the button 158 riding up the ramp formed by tab element 150 and causing the sheave half 112 to rotate and axially relocate with respect to sheave half 114 from the position of FIGURE 6 to a position as shown in FIGURE 7.

With the intercooperating tab and slot means 144–149 on the respective sheave halves 112 and 114, rotational movement of one sheave half with respect to the other will result through a ramp action in axial relocation of sheave half 112 with respect to sheave half 114, reducing the space between the sheave halves 112, 114 to increase the effective diameter of the pulley and reduce or substantially eliminate any slack existing in the belt 170. Should the tension of belt 170 become too high due to, for example, the load on the pulley being released that caused the effective diameter thereof to increase, in the manner set forth above, such tension will cause sheave half 112 to slip on the belt 170 and rotate and axially relocate relative to sheave half 114 in a direction to decrease the effective pulley diameter to that necessary to maintain desired belt tension.

It is believed that the modified pulley apparatus 100 has been adequately described to present a clear understanding to those skilled in the art, especially in view of the disclosure of very similar pulley apparatus in the aforementioned application Serial No. 250,672, now Patent No. 3,161,071, filed January 10, 1963.

As shown in FIGURE 4, a maintaining means 180 is provided for releasably, substantially permanently maintaning the compensating tab and slot means 144–149 and thus the sheave halves 112, 114 in any one of a substantially infinite plurality of compensated positions. The maintaining means 180 is substantially the same in construction and operation as the aforedescribed clutch means 80 shown in FIGURES 1 and 2.

The maintaining means 180 comprises a stop member 182 which is attached to the hub member 124 and shaft 126 in any suitable manner such as by a countersunk screw 184. The stop member 182 has an annular tapered surface or face 188 extending downwardly towards the face 189 of the sheave half 112 to define a substantially V-shaped cam groove 190 therebetween. Slidably disposed for contraction in the cam groove 190 is a garter spring 192 of any suitable or conventional type which is in firm contact with the tapered stop member face 188 and the sheaf half face 189 (see FIGURE 4). The maintaining means 180 functions to retain the sheave halves 112, 114 in a compensated position in the same manner as the aforedescribed maintaining means 80 of FIGURES 1 and 2, and thus there is no necessity herein for the repetition of the description of the operation of the maintaining means 80 with respect to the maintaining means 180 which is substantially identical thereto in construction and operation.

While the invention has been shown, illustrated, described and disclosed in terms of one or more embodiments or modifications which has been assumed in practice, the scope of the invention should not be deemed to be limited by the precise embodiments or modifications herein shown, illustrated, described or disclosed, such other embodiments or modifications intended to be reserved especially as they fall within the scope of the claims here appended.

What is claimed is:

1. A pulley apparatus for automatically maintaining a constant tension on a cooperating drive means, comprising:
    a generally cylindrical hub member,
    a first sheave half secured to said hub member and extending generally radially outwardly therefrom,
    a second sheave half rotatably and slidably mounted on said hub member and axially spaced from said first sheave half, said sheave halves being adapted to receive said drive means therebetween and defining the effective diameter of said pulley apparatus in accordance with the axial spacing therebetween,
    interfitting compensating means on said sheave halves having cooperating surfaces effective to control rotation of one of said sheave halves relative to the other in response to variations in loads imposed on said pulley apparatus to vary the axial spacing between said sheave halves and thus the effective diameter of said pulley apparatus, thereby maintaining a constant tension on said drive means, and
    means for releasably maintaining said sheave halves in any one of a plurality of relative compensating positions, said maintaining means comprising in turn:
        an annular stop member rigidly secured to said hub member and having a tapered face extending downwardly towards said second sheave half, and
        an annular garter-type spring in engagement with said tapered face and disposed between said second sheave half and said stop member,
    said garter-type spring being only radially inwardly movable on said tapered face and adapted to exert a sufficient force against said second sheave half to maintain said sheave halves in a compensating position against the force of said drive means.

2. The pulley apparatus as recited in claim 1 wherein said interfitting compensating means comprises:
    a first annular insert secured to said first sheave half and having a threaded portion on the interior surface thereof, and
    a second annular insert secured to said second sheave half and having an exterior threaded portion in mutually cooperative engagement with said first insert threaded portion.

3. The pulley apparatus as recited in claim 2 wherein said second insert is rotatably mounted on said hub member and is provided with a generally flat, upstanding face disposed adjacent to said tapered face of said stop member to define a generally V-shaped cam groove therebetween, and
    said garter-type spring is movably disposed in said cam groove and in frictional engagement with said flat, upstanding face of said second insert.

4. The pulley apparatus as recited in claim 3 wherein said first and second inserts are formed of plastic and are molded onto said first and second sheave halves, respectively.

5. The pulley apparatus as recited in claim 1 wherein said interfitting compensating means comprises:
    a first tab means on said first sheave half disposed radially outwardly from said hub member and providing a first surface inclined with respect to said first sheave half, and
    a second tab means on said second sheave half disposed radially outwardly from said hub member and providing a second surface inclined with respect to said second sheave half,
    said second inclined surface being disposed adjacent to and in substantially parallel relation to said first inclined surface and cooperable therewith to control relative movement between said first and second sheave halves.

6. The pulley apparatus as recited in claim 5 wherein one of said tab means comprises a button member secured thereto which is slidably engageable with the other of said tab means.

7. The pulley apparatus as recited in claim 6 wherein said second sheave half is provided with a generally flat, upstanding surface adjacent to said tapered face of said stop member to define a generally V-shaped cam groove therebetween, and
    said garter-type spring is movably disposed in said cam groove and in frictional engagement with said flat, upstanding surface of said second sheave half.

8. A pulley apparatus for automatically maintaining a constant tension on a cooperating drive means, comprising:
    a hub member,
    a first sheave half secured to said hub member and having a threaded annular insert secured thereto in outwardly spaced relation to said hub member,
    a second sheave half rotatably and slidably mounted on said hub member for axial movement with respect to said first sheave half and having a threaded annular insert secured thereto adjacent said hub member and in mutually cooperative engagement with said first sheave half insert,
    said sheave halves being adapted to receive said drive means therebetween and defining the effective diameter of said pulley apparatus in accordance with the axial spacing therebetween,
    said mutually cooperatively engaged threaded inserts being adapted to control rotation of one of said sheave halves relative to the other in response to variations in loads imposed on said pulley apparatus to vary the axial spacing between said sheave halves and thus the effective diameter of said pulley apparatus to maintain a constant tension on said drive means, and
    maintaining means for releasably maintaining said sheave halves in any one of a plurality of relative compensating positions, said maintaining means comprising in turn:
        an annular stop member secured to said hub member and having a tapered face extending downwardly towards said threaded insert on said second sheave half,
        said second sheave half threaded insert having a generally straight face adjacent said tapered stop member face to define a generally V-shaped cam groove therebetween, and
        an annular garter-type spring movably disposed in said cam groove and in frictional engagement with said stop member tapered face and said straight face of said second sheave half threaded insert,
    said garter-type spring being only radially movable in said cam groove and adapted to exert a sufficient force against said second sheave half threaded insert to releasably maintain said sheave halves in a compensating position against the force of said drive means.

9. A pulley apparatus for automatically maintaining a constant tension on a cooperating drive means, comprising:
 a hub member,
 a first sheave half secured to said hub member and having a plurality of first tab elements formed thereon in inclined relation thereto, said first tab elements being disposed in spaced relation to said hub member,
 a second sheave half rotatably and slidably mounted on said hub member for axial movement with respect to said first sheave half and having a plurality of second tab elements formed thereon in inclined relation thereto, said second tab elements corresponding in number to and disposed adjacent to and in substantially parallel relation to said first tab elements,
 said sheave halves being adapted to receive said drive means therebetween and defining the effective diameter of said pulley apparatus in accordance with the axial spacing thereof,
 said first and second tab elements being mutually cooperable to control rotation of one of said sheave halves with respect to the other in response to variations in loads on said pulley apparatus to vary the axial spacing between said sheave halves and thus the effective diameter of said pulley apparatus to maintain a constant tension on said drive means, and
 maintaining means for releasably maintaining said sheave halves in any one of a plurality of compensating positions, said maintaining means in turn comprising:
  an annular stop member secured to said hub member and having a tapered face extending downwardly towards said second sheave half,
  said second sheave half having a generally straight face adjacent said tapered face to define a generally V-shaped cam groove therebetween, and
  an annular garter-type spring movably disposed in said cam groove and in frictional engagement with said stop member tapered face and said second sheave half straight face,
 said garter-type spring being only radially movable in said annular cam groove to thus maintain the second sheave half in any one of said plurality of compensating positions thereof relative to the first sheave half.

10. In a pulley apparatus comprising a hub member, a first sheave half secured to the hub member, a second sheave half rotatably and slidably mounted on the hub member and axially spaced from the first sheave half, the sheave halves adapted to receive a drive means therebetween and defining the effective diameter of the pulley apparatus in accordance with the axial spacing thereof, and interfitting compensating means on the sheave halves having cooperating surfaces for controlling rotation of one of the sheave halves relative to the other in response to variations in load on the pulley apparatus to vary the axial spacing of the sheave halves and thus the effective pulley diameter to maintain a constant tension on the drive means,
 the improvement comprising:
  a maintaining mechanism for releasably maintaining the sheave halves in any one of a plurality of compensating positions, said maintaining mechanism comprising:
   an annular stop member adapted to be rigidly secured to the hub member and having a tapered face adapted to extend downwardly towards the second sheave half, and
   an annular garter-type spring in engagement with said tapered face and adapted to be frictionally disposed between the second sheave half and said stop member,
  said garter-type spring being only radially inwardly movable and adapted to exert a sufficient force against the second sheave half to maintain the sheave halves in a compensating position against the force of the drive means.

References Cited by the Examiner
UNITED STATES PATENTS

| 2,916,926 | 12/1959 | Albertson et al. | 74—230.17 |
| 3,114,271 | 12/1963 | Davis | 74—230.17 |
| 3,161,071 | 12/1964 | Getz | 74—230.24 |
| 3,196,702 | 1/1965 | Getz et al. | 74—230.17 |

DAVID J. WILLIAMOWSKY, *Primary Examiner.*

L. H. GERIN, *Assistant Examiner.*